United States Patent [19]

Brannen et al.

[11] 3,791,805

[45] Feb. 12, 1974

[54] TRANSITION METAL COMPLEXES AS FUEL AND MOTOR OIL ADDITIVES

[75] Inventors: William T. Brannen, West Lake, Ohio; Roger W. Watson, Highland, Ind.

[73] Assignee: Standard Oil Company, Chicago, Ill.

[22] Filed: Oct. 10, 1969

[21] Appl. No.: 865,498

[52] U.S. Cl. .................................. 44/68, 252/35
[51] Int. Cl. .............................................. C10l 1/24
[58] Field of Search.. 252/18, 34, 35; 44/68, DIG. 2

[56] References Cited
UNITED STATES PATENTS

| 3,413,222 | 11/1968 | Holter | 252/35 |
| 2,851,417 | 9/1958 | Andress | 252/18 |
| R26,433 | 8/1968 | Le Suer | 252/34 |
| 3,306,908 | 2/1967 | Le Suer | 252/35 |
| 2,294,525 | 9/1942 | Waugh | 252/34 |
| 2,464,497 | 3/1949 | Giammaria | 252/34 |
| 3,338,935 | 8/1967 | Kerschner et al. | 252/32.5 |
| 3,649,661 | 3/1972 | Otto et al. | 252/33 |

Primary Examiner—Patrick P. Garvin
Assistant Examiner—I. Vaughn
Attorney, Agent, or Firm—Arthur G. Gilkes; William T. McClain

[57] ABSTRACT

The disclosure describes the reaction product produced by the reaction of about equal molar portions of (1) a polymeric succinic anhydride, polymeric succinic acid or polymer succinimide having an average molecular weight between about 250 and 2,500, and (2) a transition metal complexed with a polyamine.

1 Claim, No Drawings

TRANSITION METAL COMPLEXES AS FUEL AND MOTOR OIL ADDITIVES

BACKGROUND OF THE INVENTION

In many cases it is desirable to have an additive for hydrocarbon fuels which conducts static electricity from the fuel to ground. Such a fuel additive is termed an antistatic agent. These agents are commonly employed by hydrocarbon fuel manufacturers to prevent static charge buildup in fuels while they are in transit and thereby reduce the possibility of explosions. The main considerations in formulating an antistatic agent are finding the minimum concentration, the least expensive components and the most inert formula possible. The purpose of such considerations is to minimize possible undesirable effects of the antistatic agent and produce a low cost antistatic agent.

Alternatively, it is desirable in formulating antistatic agents to find one which is multifunctional. That is, it is desirable to have an antistatic agent which may inhibit oxidation, enhance lubricating properties of the fuel or lubricant to which it is added and/or suspend foreign material to prevent accumulation and deposits on metal surfaces. Frequently, it is the case that multifunctional agents have been discovered but have been too expensive to incorporate as antistatic agents. Also many times such antistatic agents tend to deposit in the induction system of the engine and build up to effect engine performance (the term "induction system" as used herein is intended to mean the path that the incoming air follows in an automobile engine through the air cleaner, carburetor and intake manifold into the cylinders. This air is of course an air-gasoline mixture after passing through the carburetor.) The problem is then to find an inexpensive antistatic agent that will be multifunctional and will not itself deposit further along the induction system of the engine.

Another important property of antistatic agents is inertness to other additives which may be incorporated into the hydrocarbon fuel or lubricating oil. Reaction would of course deplete the effective additive in the fuel or lubricating oil and tend to reduce its overall efficiency as well as increase the need for additional additive. Most desirable, then, is an antistatic agent which readily disperses into the hydrocarbon fuel or lubricating oil and serves as a conductive agent, yet remains inert to other active additives in such fuel or lubricating oil.

SUMMARY OF THE INVENTION

Briefly, the invention can be described as the reaction product produced by the reaction of (1) about equal molar portions of an alkenyl substituted succinic anhydride, alkenyl substituted succinic acid or alkenyl substituted succinimide having an average molecular weight between about 250 and 2,500 and (2) a transition metal complexed with a polyamine.

The reaction product is proposed as a hydrocarbon fuel or lubricating oil additive. It would be used in hydrocarbon fuels in a concentration of from about 0.0001 percent to about 0.5 percent based upon the weight of hydrocarbon fuel. As a fuel additive, the reaction product acts as an antistatic agent, reducing the build up of static electricity during the loading or unloading of fuel. In lubricating oils the reaction product can be added in amounts ranging from about 0.1 percent to about 10 percent based on the weight of oil of lubricating viscosity. As a lubricating oil additive, the reaction product acts as an antistatic agent and inhibits oxidation and wear of metal surfaces as well.

Transition metal complexes useful in the invention of this disclosure are described in The Journal of the American Chemical Society in volume 88 at pages 2156 through 2162 (1966), hereby incorporated by reference. Nonlimiting examples of metal salts useful in forming transition metal complexes are the transition metal chlorides, perchloroates, nitrates, thiocyanates, oxalates, bromides and fluoborates. Nonlimiting examples of the transition metals are those selected from the group consisting of cadmium, chromium, cobalt, copper, iron, manganese, molybdenum, mercury, nickel, rhodium, silver, titanium, tungsten, vanadium, and zinc.

Any polyamine can be complexed with the various transition metals. Suitable polyamines generally come within the formula $H_2N(\text{-alkylene-NH})_nH$, in which $n$ is an integer from about 1 to about 12, and 'alkylene' is a saturated divalent hydrocarbon containing from about 1 to about 10 carbon atoms. Suitable polyamines include, for example, butylene polyamines, and cyclic homologues of such polyamines, for example, piperazines. Specific example of alkylene polyamines are: ethylene diamine, hexamethylene diamine, diethylene triamine, triethylene tetramine, tetraethylene pentamine, hexaethyleneheptamine and N-2-aminoethylpiperazine. Polyethylene polyamines are generally preferred, pentaethylenehexamine being particularly preferred since the transition metals generally from hexaccordinate complexes.

PREFERRED EMBODIMENTS

For simplicity in the following Examples, the designations below shall mean a polyisobutenyl radical, attached to the succinic acid, anhydride or imide structure at the No. 2 position, having its double bond between the second and third carbon atoms from the point of attachment and having an average molecular weight and average number of carbon atoms as follows:

| Designation | Average Molecular Weight | Average Number of Carbon Atoms |
|---|---|---|
| L-4 | 280 | 20 |
| L-10 | 320 | 23 |
| L-50 | 420 | 30 |
| H-100 | 920 | 66 |

EXAMPLE I

Ninety g. of a 50% pentaethylenehexamine (PEHA)-CrCl$_3$ complex in 100 ml of methanol (prepared by reacting equimolar amounts of CrCl$_3$ with pentaethylenehexamine (PEHA) in methanol at a temperature in the range of from about 70°F. to about 300°F. for about one-half to about 10 hours) and 100 g. of L–50 polymeric succinic anhydride (PSA) in 100 ml of hexane were reacted at from about 70°F. to about 200°F. for 1.5 hours. The methanol and hexane were removed by atmospheric distillation. The reaction mixture became very viscous. Upon completion of the distillation, the mixture was diluted with 100 ml of hexane and filtered, giving a bright red solution with the following analysis: % Cr = 2.89, % Cl = 5.9, in weight percent on the total weight of solution.

EXAMPLE II

Fifty-three g. of Cu(BF$_4$)$_2$ was added to 23.2 g. of pentaethylenehexamine (PEHA) in 10 ml of methanol, refluxed 15 minutes and then 58 g. of L–10 polymeric succinic anhydride in 200 ml of isooctane were added. The entire reaction mixture was reacted at a temperature in the range of about 70°F. to about 300°F. for 2 hours after which all the methanol and water were removed by atmospheric distillation. The mixture was then filtered giving a fluid blue colored solution with the following analysis: % Cu = 4.05, weight percent based on the total weight of solution.

EXAMPLE III

Other polymeric succinic anhydrides such as L–4, L–50 and H–100 polymeric succinic anhydrides can be substituted for the L–10 variety of Example II. Such alkenyl succinic anhydrides can then be reacted with transition metal complexes, preparation of which is exemplified in Example I and in the Journal of the American Chemical Society (previously cited). The reaction products are found to be a useful multipurpose gasoline and lubricating oil additives.

We claim:

1. Gasoline containing 0.0001 to 0.5 weight percent of a metal complex consisting essentially of the reaction product of equimolar amounts of (a) a polyisobutenyl-substituted succinic anhydride wherein the polyisobutenyl moiety has an average molecular weight of about 250 to about 2,500, and (b) a metal complex of the group consisting of chromium and copper complexed with an equimolar amount of pentaethylenehexamine wherein both said reaction product and said complex being formed at from about 70°F. to about 300°F.

* * * * *

UNITED STATES PATENT OFFICE
CERTIFICATE OF CORRECTION

Patent No. 3,791,805            Dated February 12, 1974

Inventor(s) William T. Brannen et al.

It is certified that error appears in the above-identified patent and that said Letters Patent are hereby corrected as shown below:

Column 2, line 38, for "example" read -- examples --;

line 44, for "from" read -- form --.

Column 3, line 21, for "10 ml" read -- 100 ml --.

Signed and sealed this 14th day of May 1974.

(SEAL)
Attest:

EDWARD M. FLETCHER, JR.        C. MARSHALL DANN
Attesting Officer        Commissioner of Patents